(12) United States Patent
Yousaf et al.

(10) Patent No.: US 10,127,276 B2
(45) Date of Patent: ***Nov. 13, 2018

(54) METHOD AND SYSTEM FOR DYNAMICALLY OPTIMIZING CLIENT QUERIES TO READ-MOSTLY SERVERS

(71) Applicant: Dell Products L.P., Round Rock, TX (US)

(72) Inventors: Muhammad Yousaf, Austin, TX (US); Richard J. Cardone, Austin, TX (US); Swathi Gangisetty, Santa Barbara, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/040,851

(22) Filed: Feb. 10, 2016

(65) Prior Publication Data

US 2016/0162544 A1 Jun. 9, 2016

Related U.S. Application Data

(63) Continuation of application No. 13/648,903, filed on Oct. 10, 2012, now Pat. No. 9,292,568.

(51) Int. Cl.
*G06F 17/30* (2006.01)

(52) U.S. Cl.
CPC .. *G06F 17/30448* (2013.01); *G06F 17/30442* (2013.01); *G06F 17/30867* (2013.01)

(58) Field of Classification Search
CPC ......... G06F 17/30463; G06F 17/30466; G06F 17/30489

See application file for complete search history.

(56) References Cited

U.S. PATENT DOCUMENTS

| | | | |
|---|---|---|---|
| 6,577,597 B1 | 6/2003 | Natarajan et al. | 370/232 |
| 8,078,632 B1 * | 12/2011 | Stoutamire | G06F 17/30784 707/759 |
| 2004/0011735 A1 | 1/2004 | Hahn | 210/610 |
| 2005/0267858 A1 | 12/2005 | Harvey et al. | 707/1 |
| 2006/0004695 A1 * | 1/2006 | Day | G06F 17/30463 |
| 2012/0203762 A1 | 8/2012 | Kakarlamudi et al. | 707/718 |
| 2012/0323885 A1 | 12/2012 | Wang | |
| 2013/0262436 A1 | 10/2013 | Barsness et al. | 707/718 |

* cited by examiner

*Primary Examiner* — Hung Q Pham
(74) *Attorney, Agent, or Firm* — Baker Botts L.L.P.

(57) ABSTRACT

A system and method of query optimization are disclosed. A complexity measure of a client query received from a client application is compared to a predetermined threshold, which is determined using at least one of system data and query execution data. An optimized query is generated by modifying the client query to reduce the complexity measure of the client query if the complexity measure of the client query exceeds the predetermined threshold. The optimized query is submitted to a server application on a server and a post-processing routine to be applied to the result set is selected.

17 Claims, 3 Drawing Sheets

METHOD AND SYSTEM FOR DYNAMICALLY OPTIMIZING CLIENT QUERIES TO READ-MOSTLY SERVERS

CROSS-REFERENCE TO RELATED APPLICATIONS

The present application is a continuation of U.S. patent application Ser. No. 13/648,903 filed Oct. 10, 2012, which is hereby incorporated by reference.

TECHNICAL FIELD

The present disclosure relates generally to query optimization, and more particularly to dynamic optimization of client queries to servers whose data change slowly.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Query performance affects a user's ability to search and access information that is stored in information handling systems. This is especially true with respect to applications that use read-mostly servers. Read-mostly servers contain data that change at a slow rate, which implies that queries usually return the same results each time they run. For example, servers that support the Lightweight Directory Access Protocol (LDAP) are often read-mostly because directory information is relatively stable. Similarly, servers that support the Machine Readable Cataloging (MARC 21) bibliographic standard, as well as servers that hold historical information in general, tend to be read-mostly.

Response time at the client is an important performance measure of client/server systems. Response time is a function of client processing time, server processing time, and network transmission time. A traditional approach to improving response time is to increase client, server, or network capacity. This approach, however, is not always feasible given budget constraints. Another approach is to reconfigure the server to better handle the type and number of queries that are expected. Server tuning approaches like this can alleviate performance problems some of the time, but they cannot always adapt to changing workloads in the information handling system (i.e., changes in overall server load or changes in network load).

Moreover, server tuning may not be effective in mixed workload environments that change over time. In particular, there may be no way to optimize for both selective and unselective queries over the same data. A selective query is one in which the server performs all the filtering necessary to produce the precise result set specified by the query. An unselective query, on the other hand, avoids some server overhead by returning a superset of the required result set at the possible risk of incurring greater network and client overhead. It is then up to the client to complete result set filtering. The conditions that favor one style of a query over another can change dynamically and, therefore, are not amenable to static solutions.

SUMMARY

In one embodiment of the present disclosure, a method of query optimization, is presented. The method includes comparing a complexity measure of a client query received from a client application to a predetermined threshold, wherein the predetermined threshold is determined using at least one of system data and query execution data. The method also includes generating an optimized query by modifying the client query to reduce the complexity measure of the client query if the complexity measure of the client query exceeds the predetermined threshold. Additionally, the method includes submitting the optimized query to a server application on a server and selecting a post-processing routine to be applied to the result set.

In another embodiment of the present disclosure, a system includes a processor and a computer readable medium communicatively coupled to the processor. The computer readable medium includes computer-executable instructions encoded in the computer readable medium, that, when executed by the processor, are operable to compare a complexity measure of a client query received from a client application to a predetermined threshold, wherein the predetermined threshold is determined using at least one of system data and query execution data. The computer-executable instructions are further operable to, when executed by the processor, generate an optimized query by modifying the client query to reduce the complexity measure of the client query if the complexity measure of the client query exceeds the predetermined threshold. Additionally, the computer-executable instructions are further to, when executed by the processor, submit the optimized query to a server application on a server and select a post-processing routine to be applied to the result set.

In still another embodiment of the present disclosure, a non-transitory, computer readable medium includes computer-executable instructions encoded in the computer readable medium, that, when executed by the processor, are operable to compare a complexity measure of a client query received from a client application to a predetermined threshold, wherein the predetermined threshold is determined using at least one of system data and query execution data. The computer-executable instructions are further operable to, when executed by the processor, generate an optimized query by modifying the client query to reduce the complexity measure of the client query if the complexity measure of the client query exceeds the predetermined threshold. Additionally, the computer-executable instructions are further to, when executed by the processor, submit the optimized query to a server application on a server and select a post-processing routine to be applied to the result set.

BRIEF DESCRIPTION OF THE DRAWINGS

A more complete understanding of the disclosed embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components or the information handling system may include one or more disk drives, one or more network ports for communicating with external devices as well as various input and output (I/O) devices, such as a keyboard, a mouse, touchscreen and/or a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

The teachings of this disclosure may be used to improve query performance through query optimization. In some embodiments, query optimization may include reducing the time it takes for the client application to receive the desired result set in order to improve query performance.

Figure 1:
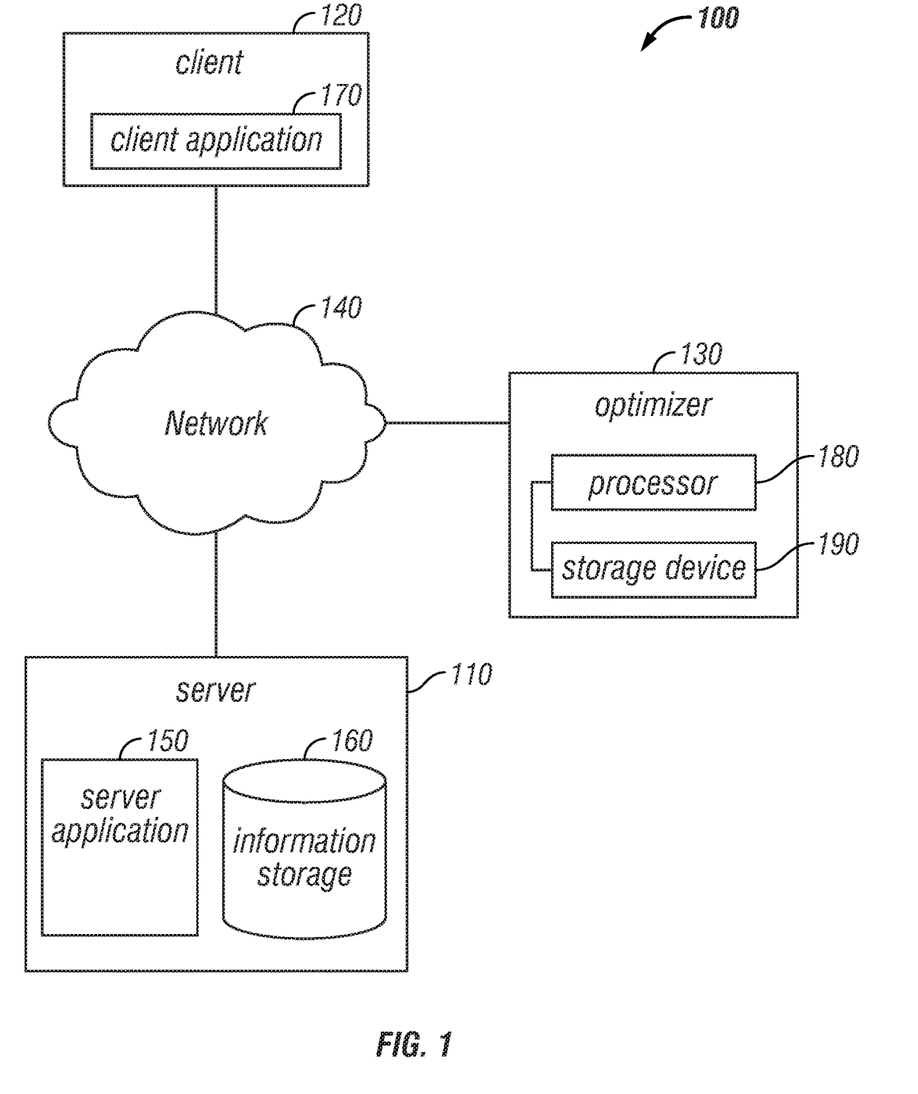
FIG. 1 illustrates a block diagram of an example system for dynamically optimizing client queries to a server in accordance with the present disclosure.

FIG. 1 illustrates a block diagram of an example system 100 for dynamically optimizing client queries to servers in accordance with the teachings of the present disclosure. System 100 may represent any suitable system having one or more information handling systems and/or information handling resources. In some embodiments, system 100 may include a server 110, a client system 120, and an optimizer 130. Server 110, client system 120, and optimizer 130 may be communicatively coupled via network 140.

Network 140 may be a network and/or fabric configured to communicatively couple server 110, client system 120, optimizer 130, and/or any element associated with system 100. Network 140 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 140 may transmit data using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), advanced technology attachment (ATA), serial ATA (SATA), advanced technology attachment packet interface (ATAPI), serial storage architecture (SSA), integrated drive electronics (IDE), and/or any combination thereof. Network 140 and its various components may be implemented using hardware, software, or any combination thereof.

Server 110 may be, for example, a read-mostly server. Server 110 may include a processor (not expressly shown), server application 150, and information storage 160. The processor may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in information storage 160 and/or another component of server 110.

Server application 150 may be any application configured to implement a protocol or standard in which the retrieval of read-mostly data involves selection or filtering. For example, server application 150 may be configured to implement the Lightweight Directory Access Protocol (LDAP), the Digital Imaging and Communications Medicine (DICOM) standard or the Machine Readable Cataloging (MARC 21) standard.

Information storage 160 may include a database, directory, or other data structure operable to store data. Further, information storage 160 may include any instrumentality or aggregation of instrumentalities that may retain data and/or instructions for a period of time. Information storage 160 may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data.

Client system 120 may be, for example, a personal computer, terminal, or network computer. System 100 may include additional or fewer client systems, as desired. Client system 120 may include a processor (not expressly shown), a memory (not expressly shown), and a client application 170, which may include any application for interacting with a read-mostly server. The processor may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in the memory and/or another component of client system 120.

The memory may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing. Further, the memory may include a database containing query modification strategies (e.g., ways in which queries may be modified to generate an optimized query) and their corresponding post-processing instructions.

Client application 170 may be a directory look-up application, which queries server application 150 for desired directory entries. Although client application 170 may follow best practices when constructing queries, the queries may not yield optimal performance because they do not account for the dynamic behavior of system 100. For example, client application 170 may not be configured to account for changes in the hardware and/or software of server 110, changes in the amount or organization of data stored on server 110, or changes to the configuration of the network 140. Additionally, client application 170 may not be configured to evaluate or compensate for changes in the load on server 110 or client system 120 (e.g., the amount of computational work that the server 110 or the client 120 performs), or load on network 140 (e.g., the volume of network traffic).

Optimizer 130 may be configured to optimize queries constructed by client application 170 to improve query response time (e.g., the time it takes to receive the desired result set from the server application). Optimizer 130 may include a processor 180 and a storage device 190. Processor 180 may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in storage device 190 and/or another component of optimizer 130.

Storage device 190 may be communicatively coupled to processor 180 and may include any system, device, or apparatus operable to retain program instructions or data for a period of time (e.g., computer-readable media). Storage device 190 may include random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory that retains data after power to optimizer 130 is turned off. Further, storage device 190 may include a database containing query modification strategies (e.g., ways in which queries may be modified to generate an optimized query) and their corresponding post-processing instructions. In some embodiments, optimizer 130 may be configured to improve query performance by dynamically rebalancing the load between server 110 and client system 120. For example, a client query may be constructed such that data filtering is performed by (1) server 110 (e.g., a selective query), (2) client machine 120 (e.g., an unselective query), or (3) some combination of server 110, client system 120, and optimizer 130. The load between server 110 and client system 120 may be balanced by modifying the client query to change where the filtering is performed. Thus, if the load on server 110 is high, a client query may be modified such that more of the filtering is performed by client system 120 and/or optimizer 130. Similarly, if the load on client system 120 is high, a client query may be modified such that more of the filtering is performed by server 110 and/or optimizer 130.

In one embodiment, optimizer 130 may be configured to intercept a client query before it is submitted to server application 150. Optimizer 130 may be further configured to determine whether and how a client query should be modified by comparing a complexity measure of the client query to a predetermined threshold. The complexity measure of a particular client query may be calculated using the number of operators, the type of operator, and/or the number of sub-queries in the client query. For example, a client query requesting all entries where a person's last name is Jackson, Jenkins, Johnson, Johnston, Jones, Johanssen, or Jordan may be written as: (|(lastname=Jackson)(lastname=Jenkins)(lastname=Johnson)(lastname=Johnston)(lastname=Jones)(lastname=Johanssen)(lastname=Jordan). The complexity measure of such a query may be calculated by counting the number of "or" operators, in this case six.

As another example, a particular client query may request all entries where a person's last name is Smith and the person lives in Dallas, Tex., and all entries where a person's last name is Jones and the person lives in Austin, Tex. For example, a client query of this type may be written as: (&(&(lastname=Smith)(city=Dallas, Texas))(&(lastname=Jones)(city=Austin, Texas))). The complexity measure of such a query may be calculated by counting the number of operators and/or the number of subqueries. In this example, there are three "and" operators and two subqueries. If the complexity measure of a client query exceeds the predetermined threshold, optimizer 130 may modify the query to generate an optimized query with a complexity measure that is less than the predetermined threshold.

The predetermined threshold may be selected by identifying a threshold query complexity measure that corresponds to a maximum acceptable query response time. The predetermined threshold may be determined by a user or may be dynamically determined by system 100 based on system data and/or query execution data. System data may include static system data and/or dynamic system data. Static system data may include information related to server performance characteristics; server content distribution; and a predetermined maximum load on server 110, client system 120, and/or network 140. Default values for static system data may be provided to the optimizer 130 upon installation or the optimizer may request such data from the components of system 100. Static system data may also be obtained or modified via user input.

Dynamic system data may include information related to a measure of the load on server 110, client system 120, and/or network 140 at or near the time the query is submitted. Optimizer 130 may obtain information related to the current load on server 110 by requesting such information from server 110. Similarly, optimizer 130 may obtain information related to the current load on client system 120 by requesting such information from client system 120. To obtain information related to the current load on network 140, the optimizer may submit requests to a router of network 140 or to a network interface of server 110 or client system 120.

Query execution data may include, for a particular query, information regarding the result set size; response times; execution times; load on server 110, client system 120, and/or network 140 at the time the query is submitted; and the query complexity measure. Query execution data may be collected by optimizer 130 for each query submitted to server application 150. Query execution data may be stored on the storage device 190. The types of queries that may be submitted to server application 150 may include client queries, optimized queries, and/or probe queries. Client queries may include queries constructed by client application 170 and submitted to server application 150 without modification. Optimized queries may include queries that have been modified by optimizer 130 prior to submission to sever application 150. Probe queries may be user configured queries or frequently used queries, and may be submitted to server application 150 for the purpose of collecting query execution data. Probe queries may be automatically submitted to server application 150 at predetermined times and/or intervals set by a user.

The complexity measure of a query may be reduced, and thus the query response time improved, by modifying the query such that the filtering is performed by client system 120 instead of server 110. For example, the query response time for a selective query (e.g., a query where server 110 performs the filtering) may exceed a maximum acceptable query response time when the result set size is expected to be greater than 4,000 entries. In these circumstances, a predetermined threshold could be selected such that queries with a result set size greater than 4,000 are modified by converting the query from a selective query to an unselective query, thereby transferring the filtering operation from server 110 to client system 120 or optimizer 130.

As another example, the query execution data collected by optimizer 130 may demonstrate that between 10:00 a.m. and 3:00 p.m. the query response times for server 110 exceed a maximum acceptable query response time when the result set size is expected to exceed 3,000 entries. The query execution data may further demonstrate that during all other times, the query response times for server 110 exceed a maximum acceptable query response time when the result set size is expected to exceed 5,000 entries. In these circumstances, a predetermined threshold may be selected such that a client query is modified from a selective query to an unselective query if (1) between 10:00 am and 3:00 pm, the result set size is expected to exceed 3,000 entries; or (2) the result set size is expected to be greater than 5,0000 entries. By modifying the client query in this way, the filtering is transferred from server 110 to client system 120 or optimizer 130.

As an alternative to modifying a client query by converting it from a selective query to an unselective query or vice versa, a client query may be modified by changing the database to which the query is submitted. As an example, information storage 160 may include a plurality of replica databases to which client application 170 is communicatively coupled. Client application 170 may be configured to access each of the replica databases in a predetermined order. At any given time, however, one or more of the replica databases may provide a shorter response time than the replica databases that would ordinarily be accessed first by client application 170. Based on the query execution data, optimizer 130 may modify the client query such that it is submitted to a replica database with a shorter response time.

If optimizer 130 modifies a client query to generate an optimized query, the optimizer may then submit the optimized query to server application 150. Server application 150 may process the query and generate a result set. In some embodiments, the result set may be sent to client application 170 by server application 150. In other embodiments, server application 150 may send the result to optimizer 130, which may then forward the result set to client application 170.

Where optimizer 130 has generated and submitted an optimized query, it may also generate and/or forward post-processing instructions to client application 170. If a client query has been modified by optimizer 130, the result set returned from server application 150 may not match the result set expected by client application 170. As a result, client application 170 may be provided with instructions regarding the post-processing to be performed on the result set. For example, if the optimizer modifies a client query by converting it from a selective query to an unselective query, client application 170 may be provided with instructions for filtering the result set.

In another embodiment, optimizer 130 may itself perform post-processing on the data returned from server application 150. In this case, the result set returned to client application 170 is exactly the same as it would have been had optimization not occurred.

Post-processing instructions may be generated individually by optimizer 130 or may be pulled from a database containing query modification strategies and their corresponding post-processing instructions. As stated above, such a database may be stored on storage device 190.

Figure 2:
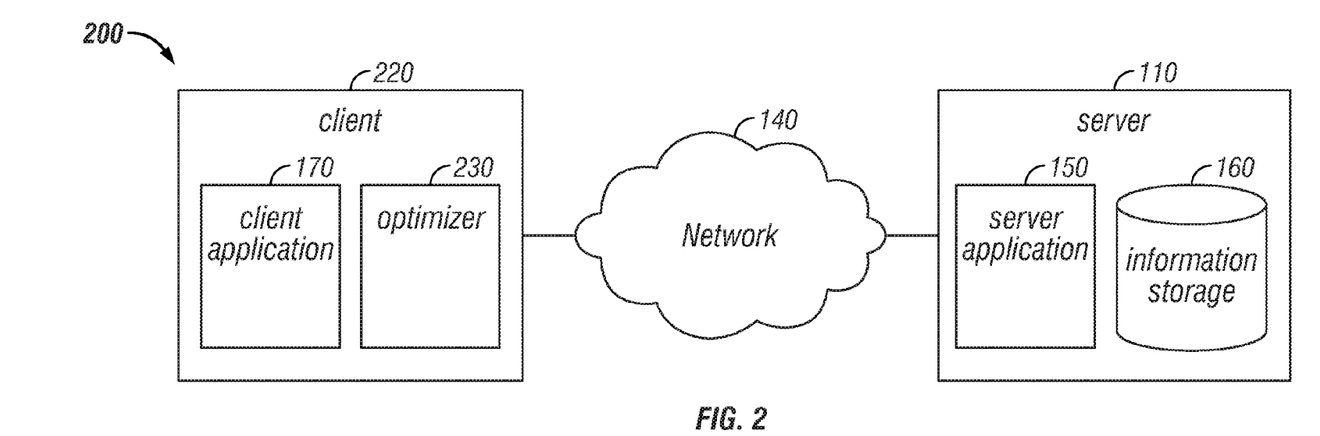
FIG. 2 illustrates a block diagram of another example system for dynamically optimizing client queries to a server in accordance with the present disclosure.

FIG. 2 illustrates another embodiment of the system illustrated in FIG. 1, in which the optimizer may be included in the client system. As shown in FIG. 2, system 200 may include server 110 and a client system 220, which may be communicatively coupled via network 140. As discussed above, server 110 may include server application 150 and information storage 160.

Client system 220 may be, for example, a personal computer, terminal, or network computer. System 200 may include additional or fewer client systems, as desired. Client system 220 may include a processor (not expressly shown), a memory (not expressly shown), a client application 170, and an optimizer 230. The processor may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in the memory and/or another component of client system 220.

The memory may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing. Further, the memory may include a database containing query modification strategies (e.g., ways in which queries may be modified to generate an optimized query) and their corresponding post-processing instructions.

As discussed above in conjunction with FIG. 1, client application 170 may include any application operable to interact with a read-mostly server. For example, client application 170 may be a directory application, which queries the server application 150 for desired directory entries.

Optimizer 230 may include hardware, software, or any combination thereof configured to modify queries constructed by client application 170 to improve query response time (e.g., the time it takes to receive the desired result set from the server application). As discussed above in conjunction with FIG. 1, optimizer 230 may intercept a client query before it is submitted to server application 150 and compare a complexity measure of the client query to the predetermined threshold. If the complexity measure of the client query exceeds the predetermined threshold, optimizer 230 may modify the query to generate an optimized query with a complexity measure that is less than the predetermined threshold. If optimizer 230 modifies a client query to generate an optimized query, the optimizer may submit the optimized query to server application 150, which may process the query and generate a result set. Additionally, the optimizer 230 may generate and/or forward post-processing instructions to client application 170 or optimizer 230 may perform the post-processing itself.

Figure 3:
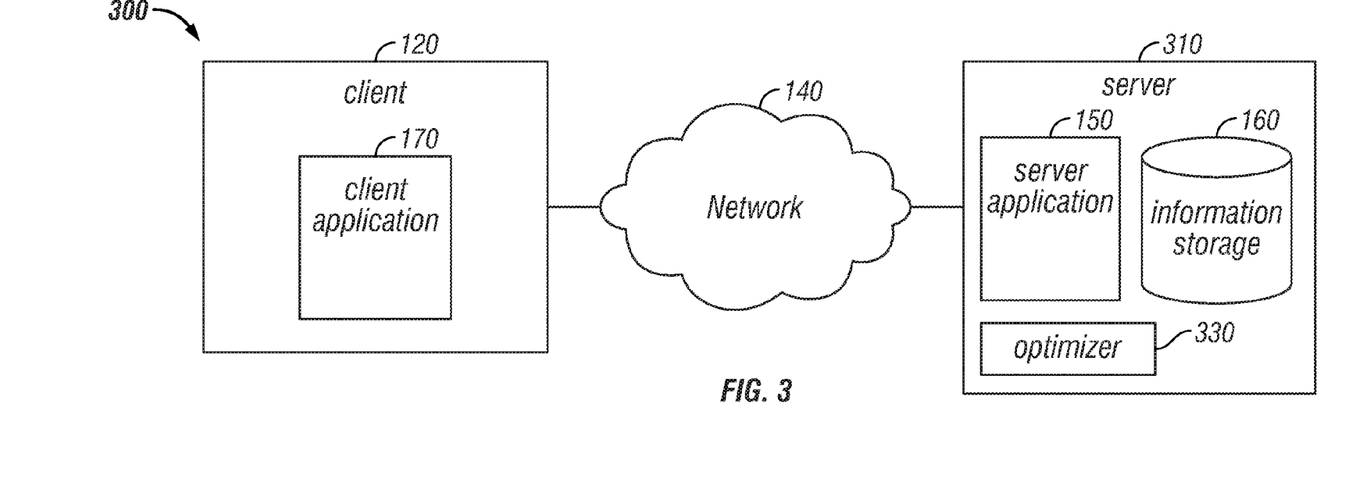
FIG. 3 illustrates a block diagram of a further example system for dynamically optimizing client queries to a server in accordance with the present disclosure.

FIG. 3 illustrates a further embodiment of the system illustrated in FIG. 1, in which the optimizer may be included in the server. As shown in FIG. 3, system 300 may include server 310 and client system 120, which may be communicatively coupled via network 140. Server 310 may be, for example, a read-mostly server. Server 310 may include a processor (not expressly shown), server application 150, information storage 160, and optimizer 330. The processor may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, the processor may interpret and/or execute program instructions and/or process data stored in information storage 160 and/or another component of server 110.

Optimizer 330 may include hardware, software, or any combination thereof configured to modify queries constructed by client application 170 to improve query response time (i.e., the time it takes to receive the desired result set from the server application). In some embodiments, optimizer 330 and server application 150 may operate in a virtual environment where optimizer 330 is configured to run on a first virtual machine and server application 150 is configured to run on a second virtual machine. In such a configuration, optimizer 330 and server application 150 may be configured such that they do not compete for the same resources.

As discussed above in conjunction with FIG. 1, optimizer 330 may intercept a client query before it is submitted to server application 150 and compare a complexity measure of the client query to a predetermined threshold. If the complexity measure of a client query exceeds the predetermined threshold, optimizer 330 may modify the query to generate an optimized query with a complexity measure that is less than the predetermined threshold. If optimizer 330 modifies a client query and generates an optimized query, the optimizer may then submit the optimized query to server application 150, which may process the query and generate a result set. Additionally, the optimizer 330 may generate and/or forward post-processing instructions to client application 170 or optimizer 330 may perform the post-processing itself.

Figure 4:
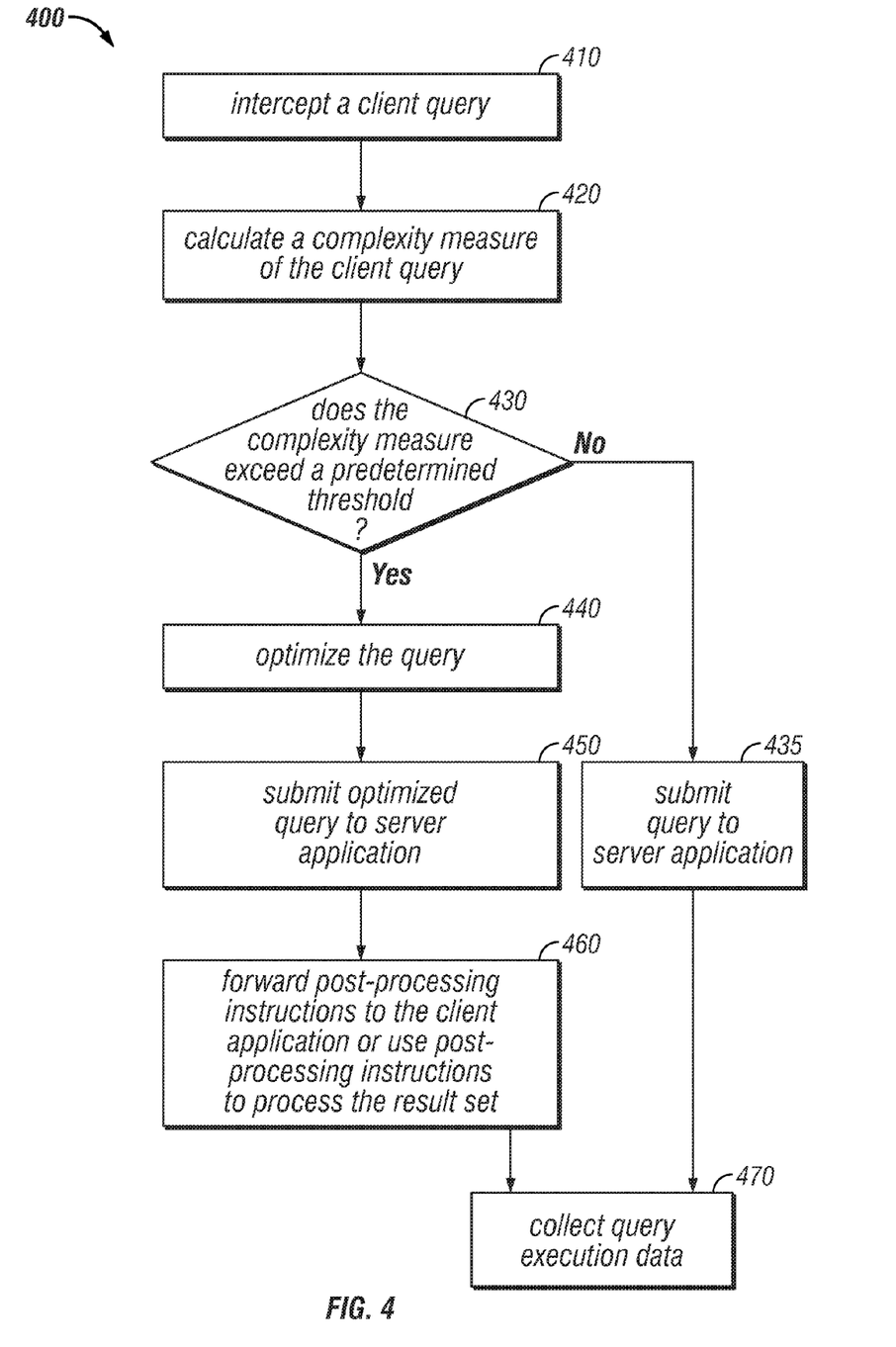
FIG. 4 illustrates a flow chart of an example method for dynamically optimizing client queries to a server in accordance with the present disclosure.

FIG. 4 illustrates an example method of dynamically optimizing client queries to a server in accordance with the teachings of the present disclosure. A complexity measure may be calculated for each client query and compared to a predetermined threshold. If the complexity measure of the client query exceeds the predetermined threshold, the client query may be modified to generate an optimized query, which may be submitted to a server application. The result set generated by the server application from processing the optimized query may differ from the result set that may have been generated if the client query were submitted without modification. As a result, the client application may be provided with instructions regarding the filtering to be performed on the result set.

If the complexity measure of the client query does not exceed the predetermined threshold, the client query may be submitted to the server application without modification. Query execution data may be collected for both optimized queries and client queries that may be submitted to the server without modification.

At step 410, optimizer 130 may intercept a client query constructed by a client application before it is submitted to a server application. A client query may be sent by the client application directly to the optimizer or it may be sent to the server application and intercepted by optimizer 130. At step 420, a complexity measure of a client query is calculated. As discussed above in conjunction with FIG. 1, the complexity measure of a particular client query may be calculated by optimizer 130 using any characteristic or combination of characteristics of a query, including but not limited to the type of operators, number of operators, and/or number of sub-queries in the client query. At step 430, optimizer 130 may compare the complexity measure of the client query to a predetermined threshold. As discussed above in conjunction with FIG. 1, the predetermined threshold may be determined based system data and/or query execution data.

If the complexity measure of the client query does not exceed the predetermined threshold, the method may proceed to step 435. At step 435, the client query may be submitted to a server application 150 without modification.

At step 470, query execution data for the submitted query may be collected by optimizer 130. As discussed above in conjunction with FIG. 1, query execution data may include, for a particular query, information regarding the result set size; response times; execution times; load on the server, client system, and/or network at the time the query is submitted; and the query complexity measure.

If, on the other hand, the complexity measure of the client query exceeds the predetermined threshold, the method may proceed to step 440. At step 440, optimizer 130 may modify the client query to generate an optimized query with a complexity measure that is less than the predetermined threshold. At step 450, optimizer 130 may submit the optimized query to server application 150. At step 460, optimizer 130 may determine whether post-processing instructions are necessary. As discussed above, a client query may be modified by converting the query from a selective query to a less selective query; thus, the result set returned from the server application may be unfiltered. Post-processing may be needed by client application 170 to filter the result set. If such post-processing instructions are needed, optimizer 130 may generate them. Optimizer 130 may then execute said post-processing instructions or may forward the post-processing instructions to client application 170 for execution.

At step 470, optimizer 130 may collect query execution data for the optimized query. As discussed above in conjunction with FIG. 1, query execution data may include, for a particular query, information regarding the result set size; response time; execution time; load on the server, client system, and/or network at the time the query is submitted; and the query complexity measure.

Method 400 may be implemented using the system of FIGS. 1-3, or any other system operable to implement method 400. As such, the preferred initialization point for method 400 and the order of the steps comprising method 400 may depend on the implementation chosen. In some embodiments, some steps may be optionally omitted, repeated, or combined. In some embodiments, portions of method 400 may be combined. In certain embodiments, method 400 may be implemented partially or fully in software embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A method of query optimization, comprising:
comparing a complexity measure of a client query received from a client application to a predetermined threshold, the client query received before the client query reaches a server application on a server, wherein the predetermined threshold is determined based on query execution data collected from at least one previous query;
generating an optimized query by modifying the client query to reduce the complexity measure of the client query if the complexity measure of the client query exceeds the predetermined threshold, wherein an expected result set size of the optimized query is greater than an expected result set size of the client query;
submitting the optimized query to the server application on the server;
selecting a post-processing routine to be applied to a result set of the optimized query to have a filtered result set; and
returning the filtered set to the client application.

2. The method of claim 1, wherein the complexity measure of the client query is calculated using at least one of a type of operators in the client query, a number of operators in the client query, and a number of sub-queries.

3. The method of claim 1, wherein the predetermined threshold is determined further based on system data comprising at least one of:
static system data including at least one of server performance characteristics, server capacity characteristics, a server content distribution, a predetermined maximum client load, a predetermined maximum server load, and predetermined maximum network load; and
dynamic system data including at least one of a measure of the server load at the time a query is submitted, a measure of the client load at the time the query is submitted, and a measure of the network load at the time the query is submitted.

4. The method of claim 1, further comprising intercepting the client query from a client application before the client query reaches the server application.

5. The method of claim 1, wherein the query execution data comprises, for the at least one previous query, at least one of a result set size, a query response time, a query execution time, a measure of the network load at the time of query execution, and a query complexity measure.

6. The method of claim 1, wherein the at least one previous query comprises at least one of a client query, an optimized query, or a probe query.

7. The method of claim 1, further comprising:
submitting a probe query to the server application, wherein the probe query is a user configured query or a frequently used query;
automatically submitting the probe query to the server application at a selected time; and
collecting query execution data for the probe query, wherein the query execution data for the probe query includes at least one of a result set size, a query response time, a measure of the network load at the time of query execution, and a query complexity measure.

8. A system comprising:
a processor;
a computer readable medium communicatively coupled to the processor; and
computer-executable instructions encoded in the computer readable medium, the instructions, when executed by the processor, operable to perform operations comprising:
comparing a complexity measure of a client query received from a client application to a predetermined threshold, the client query received before the client query reaches a server application on a server, wherein the predetermined threshold is determined based on query execution data collected from at least one previous query;
generating an optimized query by modifying the client query to reduce the complexity measure of the client query if the complexity measure of the client query exceeds the predetermined threshold, wherein an expected result set size of the optimized query is greater than an expected result set size of the client query;

submitting the optimized query to the server application on the server;

selecting a post-processing routine to be applied to a result set of the optimized query to have a filtered result set; and returning the filtered set to the client application.

9. The system of claim 8, wherein the complexity measure of the client query is calculated using at least one of a type of operators, a number of operators in the client query or a number of sub-queries.

10. The system of claim 8, wherein:

the predetermined threshold is determined further based on system data comprising at least one of:

static system data including at least one of server performance characteristics, server capacity characteristics, a server content distribution, a predetermined maximum client load, a predetermined maximum server load, and predetermined maximum network load; and dynamic system data including at least one of a measure of the server load at the time a query is submitted, a measure of the client load at the time the query is submitted, and a measure of the network load at the time the query is submitted; and the query execution data comprises, for the at least one previous query, at least one of a result set size, a query response time, a measure of the network load at the time of query execution, and a query complexity measure.

11. The system of claim 8, wherein the at least one previous query comprises at least one of a client query, an optimized query, or a probe query.

12. The system of claim 8, wherein the instructions are further operable to perform operations comprising:

submitting a probe query to the server application, wherein the probe query is a user configured query or a frequently used query;

automatically submitting the probe query to the server application at a selected time; and collecting query execution data for the probe query, wherein the query execution data for the probe query includes at least one of a result set size, a query response time, a measure of the network load at the time of query execution, and a query complexity measure.

13. A non-transitory, computer readable medium including computer-executable instructions encoded in the computer readable medium, the instructions, when executed by the processor, operable to perform operations comprising:

comparing a complexity measure of a client query received from a client application to a predetermined threshold, the client query received before the client query reaches a server application on a server, wherein the predetermined threshold is determined based on query execution data collected from at least one previous query;

modifying the client query to generate an optimized query if the complexity measure of the client query exceeds the predetermined threshold, wherein an expected result set size of the optimized query is greater than an expected result set size of the client query;

submitting the optimized query to the server application on the server;

selecting a post-processing routine to be applied to a result set of the optimized query to have a filtered result set; and returning the filtered result set to the client application.

14. The non-transitory, computer readable medium of claim 13, wherein the complexity measure of the client query is calculated using at least one of a type of operators, a number of operators in the client query or a number of sub-queries.

15. The non-transitory, computer readable medium of claim 13, wherein:

the predetermined threshold is determined further based on system data comprising at least one of:

static system data including at least one of server performance characteristics, server capacity characteristics, a server content distribution, a predetermined maximum client load, a predetermined maximum server load, and predetermined maximum network load; and dynamic system data including at least one of a measure of the server load at the time a query is submitted, a measure of the client load at the time the query is submitted, and a measure of the network load at the time the query is submitted; and the query execution data comprises, for the at least one previous query, at least one of a result set size, a query response time, a measure of the network load at the time of query execution, and a query complexity measure.

16. The non-transitory, computer readable medium of claim 13, wherein the at least one previous query comprises at least one of a client query, an optimized query, or a probe query.

17. The non-transitory, computer readable medium of claim 13, the computer-executable instructions when executed by the processor, further operable to perform operations comprising:

submitting a probe query to the server application, wherein the probe query is a user configured query or a frequently used query;

automatically submitting the probe query to the server application at a selected time; and collecting query execution data for the probe query, wherein the query execution data for the probe query includes at least one of a result set size, a query response time, a measure of the network load at the time of query execution, and a query complexity measure.

* * * * *